(12) United States Patent
Iwamoto et al.

(10) Patent No.: US 9,344,795 B2
(45) Date of Patent: May 17, 2016

(54) ACTIVE VIBRATION NOISE SUPPRESSION APPARATUS

(71) Applicant: TOKAI RUBBER INDUSTRIES, LTD., Aichi (JP)

(72) Inventors: Hiroshi Iwamoto, Aichi (JP); Kouichi Hasegawa, Aichi (JP)

(73) Assignee: SUMITOMO RIKO COMPANY LIMITED, Aichi (JP)

( * ) Notice: Subject to any disclaimer, the term of this patent is extended or adjusted under 35 U.S.C. 154(b) by 76 days.

(21) Appl. No.: 14/298,189

(22) Filed: Jun. 6, 2014

(65) Prior Publication Data

US 2014/0286500 A1    Sep. 25, 2014

Related U.S. Application Data

(63) Continuation of application No. PCT/JP2013/067203, filed on Jun. 24, 2013.

(30) Foreign Application Priority Data

Jun. 25, 2012    (JP) .................. 2012-142021

(51) Int. Cl.
*H04R 3/00* (2006.01)
*G10K 11/00* (2006.01)
*G05D 19/02* (2006.01)

(52) U.S. Cl.
CPC ............... *H04R 3/002* (2013.01); *G05D 19/02* (2013.01); *G10K 11/002* (2013.01); *G10K 2210/129* (2013.01); *G10K 2210/1282* (2013.01); *G10K 2210/3211* (2013.01)

(58) Field of Classification Search
CPC . H04R 3/02; G10K 11/002; G10K 2210/128; G10K 2210/02; G10K 11/1788; G05D 19/20
See application file for complete search history.

(56) References Cited

U.S. PATENT DOCUMENTS 5,117,401 A * 5/1992 Feintuch ............ G10K 11/1784
367/1
5,638,305 A    6/1997 Kobayashi et al.
(Continued)

FOREIGN PATENT DOCUMENTS

JP    2000-330572    11/2000
JP    3572486    7/2004
(Continued)

OTHER PUBLICATIONS

International Search report, mailed Sep. 24, 2013, for corresponding International Application No. PCT/JP2013/067203.

*Primary Examiner* — Sonia Gay
(74) *Attorney, Agent, or Firm* — Greenblum & Bernstein, P.L.C.

(57) ABSTRACT

Provided is an active vibration noise suppression apparatus having good robustness without determining a secondary transfer function while not performing adaptive control. A first control unit generates a control signal by a first adaptive algorithm as a direct adaptive algorithm. A storing unit stores an equivalent value Gh of a secondary transfer function G which is adaptively updated as an adaptive filter by the first control unit. A second control unit uses a second adaptive algorithm which uses the equivalent value Gh of the secondary transfer function G stored in the storing unit as a feedforward coefficient and updates a filter coefficient C2 of the control signal as an adaptive filter based on the feedforward coefficient. The second control unit generates the control signal by the second adaptive algorithm when the first control unit does not generate the control signal.

5 Claims, 6 Drawing Sheets

(56) References Cited

U.S. PATENT DOCUMENTS

| | | | |
|---|---|---|---|
| 7,792,312 B2 * | 9/2010 | Inoue | G10K 11/1782 381/71.14 |
| 2004/0247137 A1 * | 12/2004 | Inoue | G10L 11/1784 381/71.4 |
| 2007/0076896 A1 | 4/2007 | Hosaka et al. | |
| 2011/0123042 A1 * | 5/2011 | Sakamoto | G10K 11/178 381/94.1 |
| 2011/0142248 A1 | 6/2011 | Sakamoto et al. | |

FOREIGN PATENT DOCUMENTS

| | | |
|---|---|---|
| JP | 2011-043636 | 3/2011 |
| JP | 4-742226 | 8/2011 |

* cited by examiner

ACTIVE VIBRATION NOISE SUPPRESSION APPARATUS

CROSS REFERENCE TO RELATED APPLICATIONS

This is a continuation of Application No. PCT/JP2013/067203, filed on Jun. 24, 2013, which is incorporated herein by reference. The present invention is based on Japanese Patent Application No. 2012-142021, filed on Jun. 25, 2012, the entire contents of which are incorporated herein by reference.

BACKGROUND OF THE INVENTION

1. Field of the Invention

The present invention relates to an apparatus for actively suppressing vibration or noise.

2. Description of the Related Art

JP-A-2000-330572 (PTL 1) and JP-B2-3572486 (PTL 2) mention that a transfer function of a secondary path (a secondary transfer function) is determined beforehand, an adaptive filter coefficient is updated by using this determined function as a feedforward coefficient, and a control signal is generated by using the adaptive filter coefficient. Examples of this kind of algorithm include a Filtered-X Least Mean Squares (LMS) algorithm. Besides, JP-B2-4742226 (PTL 3) describes a direct adaptive algorithm capable of updating an adaptive filer coefficient of a control signal without determining a secondary transfer function.

Moreover, the above PTL 1 mentions that in cancelling road noise in a vehicle interior, updates of the adaptive filter coefficient of the control signal are carried out while a vehicle idles and are not carried out while the vehicle runs. JP-A-2011-43636 (PTL 4) describes switching between generating a control signal while updating the filter coefficient of the control signal by a simultaneous equation method and generating the control signal by using the stored filter coefficient.

[PTL 1] JP-A-2000-330572
[PTL 2] JP-B2-3572486
[PTL 3] JP-B2-4742226
[PTL 4] JP-A-2011-43636

SUMMARY OF THE INVENTION

By the way, a Filtered-X LMS adaptive algorithm requires beforehand determination of a secondary transfer function but has a great effect on reducing vibration or noise at an evaluation point. On the other hand, a direct adaptive algorithm does not require beforehand determination of a secondary transfer function but has a smaller effect on reducing vibration or noise than the Filtered-X LMS adaptive algorithm. This is believed to be due to numerousness of adaptive filters which the direct adaptive algorithm uses.

However, since the secondary transfer function is changed by a variety of factors, if path conditions change from those when this function was determined, vibration or noise may be unable to be effectively reduced at an evaluation point by an adaptive algorithm using the determined function as a feedforward coefficient. It should be noted that in the above PTL 1, determination of that function is carried out while the vehicle idles. That is to say, if the secondary transfer function changes between when the vehicle is idling and when the vehicle is running, there is a risk that vibration or noise cannot be effectively reduced by this algorithm.

Moreover, when a controller using a Filtered-X LMS adaptive algorithm is mounted on a vehicle and determination of a secondary transfer function is carried out while the vehicle stops, an occupant may feel uncomfortable with vibration or noise generated for a determination procedure.

The present invention has been made in view of these circumstances. It is an object of the present invention to provide an active vibration noise suppression apparatus having good robustness without determining a secondary transfer function while not performing adaptive control.

The inventors have found out selectively using a direct adaptive algorithm and an adaptive algorithm using a feedforward coefficient, and have achieved the present invention. That is to say, an apparatus according to the present solution is designed to acquire an equivalent value of a secondary transfer function while controlling a drive device by a direct adaptive algorithm and, after that equivalent value is acquired, control the drive device by an adaptive algorithm using this equivalent value as a feedforward coefficient.

That is to say, an active vibration noise suppression apparatus according to this solution is an apparatus for actively suppressing vibration or noise at an evaluation point by driving a drive device based on an actively updated control signal, which comprises: a first control unit generating a control signal by a first adaptive algorithm, the first adaptive algorithm is a direct adaptive algorithm using at least a filter coefficient of the control signal and an equivalent value of a secondary transfer function from a point of outputting the control signal to the evaluation point as adaptive filters respectively; a storing unit for storing the equivalent value of the secondary transfer function which is adaptively updated as an adaptive filter by the first control unit; and a second control unit generating the control signal by a second adaptive algorithm when the control signal is not generated by the first control unit, the second adaptive algorithm is using the equivalent value of the secondary transfer function stored in the storing unit as a feedforward coefficient and updating a filter coefficient of the control signal as an adaptive filter based on the feedforward coefficient.

The present solution makes use of a fact that an equivalent value of a secondary transfer function is contained in adaptive filters of a first adaptive algorithm as a direct adaptive algorithm. That is to say, determination of a feedforward coefficient to be used in a second control unit is performed by execution of the first adaptive algorithm as a direct adaptive algorithm. Accordingly, while the control signal is generated by a first control unit, that is to say, the drive device is controlled so as to actively suppress vibration or noise, the equivalent value (the feedforward coefficient) of the second transfer function is determined. In this way, the feedforward coefficient does not need to be determined beforehand. Besides, since the drive device is controlled at the time of that determination, vibration or sound is not generated for that determination and, in addition, can be suppressed even at the time of that determination.

However, if the drive device is controlled only by the first adaptive algorithm as a direct adaptive algorithm, its control effect is small. Therefore, after the feedforward coefficient is determined by the first adaptive algorithm, a second adaptive algorithm is employed which updates a filter coefficient of the control signal as an adaptive filter by using the feedforward coefficient. This second adaptive algorithm is, for example, a Filtered-X LMS adaptive algorithm. That is to say, use of the second adaptive algorithm enables to produce a great control effect. That is to say, the active vibration noise suppression apparatus is good in robustness.

Preferred aspects of the active vibration noise suppression apparatus according to the present solution will be discussed below.

Preferably, the active vibration noise suppression apparatus is applied to a vehicle, and the drive device is a vibration generator for imparting vibration to a vibration member disposed in a primary transfer path from a reference point to the evaluation point. In the vehicle, vibration from the vibration generator to the evaluation point is damped vibration of single degree or multiple degrees of freedom. In this damped vibration, mass, spring constant and an attenuation coefficient are very changeable. In other words, a secondary transfer function is easily changeable. The aforementioned advantageous effects can be reliably exhibited by applying the aforementioned solution to a structure having such an easily changeable secondary transfer function.

Preferably, the active vibration noise suppression apparatus is applied to a vehicle; while controlling the drive device by the second control unit, the active vibration noise suppression apparatus switches from the control by the second control unit to control by the first control unit based on any one of the number of occupants, outdoor temperature, magnitude of an error signal and air pressure of a tire; and the first control unit updates the equivalent value of the secondary transfer function stored in the storing unit.

As described here, in a vehicle, a change in the secondary transfer function is caused by a change in the number of occupants, outdoor temperature, magnitude of an error signal, and air pressure of a tire. Therefore, the equivalent value (the feedforward coefficient) of the secondary transfer function corresponding to current conditions can be acquired by switching from the control by the second control unit to the control by the first control unit based on any one of these factors and updating the equivalent value of the secondary transfer function. As a result, vibration or noise can be reliably suppressed by the control by the second control.

Moreover, preferably, while controlling the drive device by the first control unit, the active vibration noise suppression apparatus switches from the control by the first control unit to control by the second control unit based on a lapse of time from a start of the control by the first control unit or magnitude of the error signal; and the second control unit starts the control based on the updated equivalent value of the secondary transfer function.

Upon setting a period of the control by the first control unit as mentioned above, an adaptive filter as the equivalent value of the secondary transfer function in the first control unit can be stabilized. That is to say, accuracy can be increased in determination of the equivalent value (the feedforward coefficient) of the secondary transfer function. As a result, vibration or noise can be reliably suppressed by the control by the second control unit.

Moreover, preferably, the active vibration noise suppression apparatus is applied to a vehicle; and the equivalent value of the secondary transfer function stored in the storing unit is the adaptive filter generated by the first control unit while the first control unit control during the vehicle running.

As mentioned above, determination of the feedforward coefficient, that is to say, acquisition of the equivalent value of the secondary transfer function can be carried out while the drive device is controlled by the first control unit. Therefore, even if the feedforward coefficient is determined while the vehicle runs, effect of control by the first control unit can be exhibited. Since the drive device can be controlled by the first control unit not only while the vehicle stops but also while the vehicle rims, when the stored equivalent value of the secondary transfer function deviates from an actual value, the feedforward coefficient can be immediately determined. Accordingly, accuracy can be increased in determination of the feedforward coefficient. As a result, vibration or noise can be reliably suppressed by the control by the second control.

DETAILED DESCRIPTION OF THE PREFERRED EMBODIMENTS

Hereinafter, examples of the active vibration noise suppression apparatus of the present invention will be described with reference to the drawings. It should be noted that this apparatus can be applied both as an apparatus for actively suppressing vibration and as an apparatus for actively suppressing noise. For example, this apparatus can cancel noise generated outside a building, at a position close to ears of a person in the building. Moreover, this apparatus can be used in an interior of an automobile or the like so as to cancel noise generated from an engine or road noise (noise caused by vibration transmitted from road surfaces), at a position close to ears of an occupant. This apparatus can also be used to reduce road noise and vibration in the vehicle interior not by cancelling noise at a position close to ears of an occupant but by reducing vibration of a constituent member of a transfer path.

Example 1

Outline of Active Vibration Noise Suppression Apparatus

Figure 1:
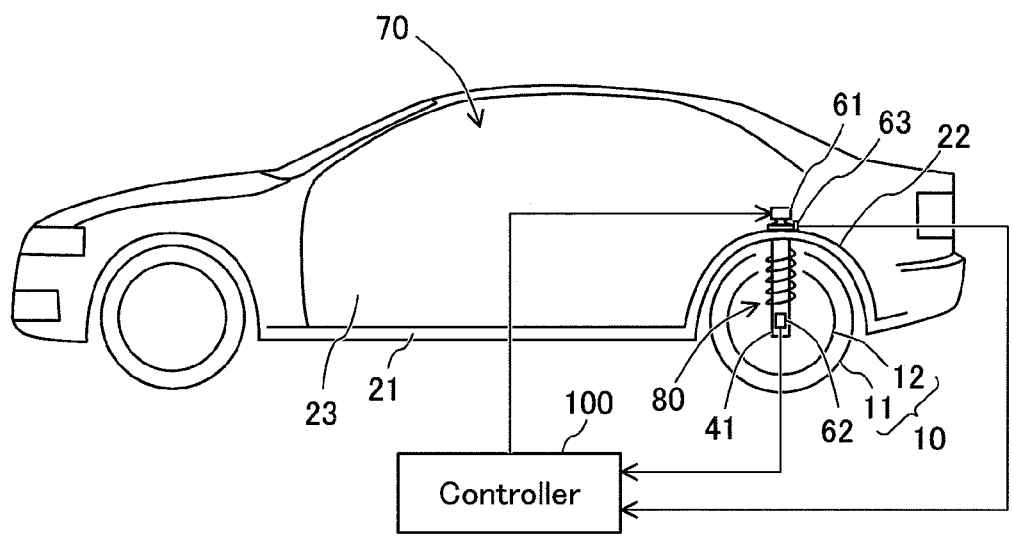
FIG. 1 is a view illustrating a structure of an active vibration noise suppression apparatus, applied to a vehicle, according to Example 1 of the present invention.

An active vibration noise suppression apparatus is an apparatus applied to a vehicle such as an automobile for reducing road noise. This apparatus reduces road noise not by generating control sound from a speaker in a vehicle interior. As shown in FIG. 1, road surface vibration caused by running of a vehicle is transmitted from a wheel 10 to a floor panel 21 via a suspension system 80 and, as a result, road noise is generated in a vehicle interior 70 by vibration of the floor panel 21.

Therefore, if the vibration of the floor panel 21 can be reduced, road noise caused by the vibration of the floor panel 21 can be reduced. However, an apparatus of this example does not directly reduce the vibration of the floor panel 21 but reduces the vibration of the floor panel 21 as a result of reducing vibration of a portion having an especially high rigidity and located in the midst of a vibration transfer path from the wheel 10 to the floor panel 21. Here, road noise is generated not only by the vibration of the floor panel 21 but also by vibration of plate-like interior parts, such as a windshield, a rear window, and door panels. In this example, suppression of road noise generated by the floor panel 21 will be discussed in detail below.

This apparatus detects vehicle vertical vibration as a reference signal by a reference signal detector 62 attached to a knuckle 41, detects vehicle vertical vibration as an error signal by an error signal detector 63 attached to a wheel housing 22, and adaptively controls a vibration generator 61 mounted on the wheel housing 22 so as to reduce the error signal. Here, the reference signal detector 62 employs an acceleration sensor and the error signal detector 63 also employs an acceleration sensor. Moreover, a position of the reference signal detector 62 is called a reference point 62 and a position of the error signal detector 63 is called an evaluation point 63.

Connection Mechanism from Wheel to Floor Panel

Figure 2:
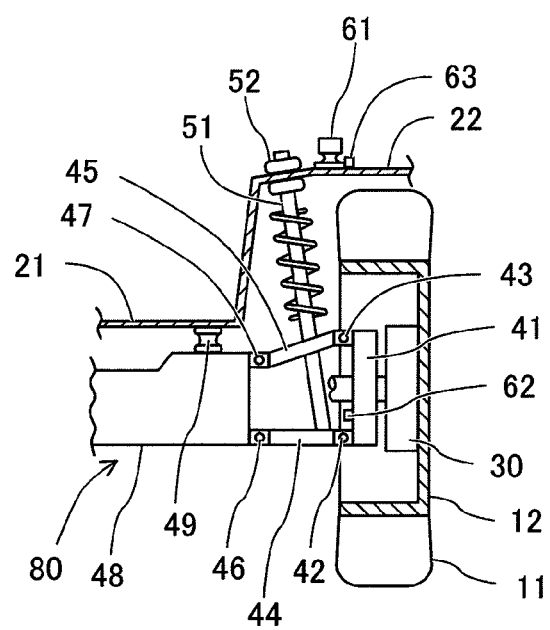
FIG. 2 is a view from rear of the vehicle illustrating a structure of a vibration transfer path from a wheel to a floor panel in FIG. 1.

A connection mechanism from the wheel 10 to the floor panel 21 will be described with reference to FIGS. 1 and 2. As shown in FIGS. 1 and 2, the wheel 10 and the floor panel 21 are connected by the suspension system 80. Specifically, an axle 30 is connected to a metal wheel 12 of the wheel 10 which holds a tire 11. Upon rotational driving force from a driving source being transmitted to this axle 30 by way of a differential, not shown, the wheel 10 rotates.

The knuckle 41 rotatably supports this axle 30. That is to say, when the metal wheel 12 moves in a radial direction, the knuckle 41 moves in association with the radial move of the metal wheel 12. In other words, the knuckle 41 is vibrated by vibration transmitted to the metal wheel 12 via the tire 11.

The knuckle 41 is connected to a lower arm 44 and an upper arm 45 as suspension arms via bushes 42, 43 comprising viscoelastic bodies. The lower arm 44 and the upper arm 45 are connected to a suspension member 48 via bushes 46, 47 comprising viscoelastic bodies. A member mount 49 comprising a viscoelastic body is attached between the suspension member 48 and a lower surface of the floor panel 21.

A lower end of a shock absorber 51 is fixed on the lower arm 44. An upper support 52 comprising a viscoelastic body is attached to an upper end of the shock absorber 51. The upper support 52 is connected to the wheel housing 22 (a member for housing the tire 11) of a vehicle body. The wheel housing 22 is connected to the floor panel 21.

Having such a structure as mentioned above, the suspension system 80 makes it difficult for vibration input from road surfaces by running of the vehicle to be transmitted from the wheel 10 to the vehicle body, while securely supporting the vehicle body (including the floor panel 21 and the wheel housing 22). Here, the suspension system 80 is a system which includes the knuckle 41, the lower arm 44, the upper arm 45, the suspension member 48, the member mount 49, the shock absorber 51, the upper support 52, and the respective bushes 42, 43, 46, 47.

Furthermore, the vibration generator 61 is mounted on the wheel housing 22. The vibration generator 61 is located at a position on the wheel housing 22 which is closer to the upper support 52 than to the floor panel 21, specifically speaking, on a portion of the wheel housing 22 near a position where the upper support 52 is mounted (a portion having a high rigidity). The vibration generator 61 is equipped with an electromagnetic actuator such as a solenoid and a voice coil and actively generates vibration force upon being supplied with an electric current. That is to say, the vibration generator 61 imparts vibration to the wheel housing 22 on which the vibration generator 61 is mounted. This vibration force is mainly exerted in a vertical direction of the vehicle. A control signal for driving the vibration generator 61 is generated by a controller 100. It should be noted that since a structure of the electromagnetic actuator used in the vibration generator 61 is known, its detailed description is omitted.

Furthermore, an acceleration sensor as the reference signal detector 62 is attached to the knuckle 41. This reference signal detector 62 detects vibration of the knuckle 41 in the vertical direction of the vehicle. On the other hand, an acceleration sensor as the error signal detector 63 is attached to the wheel housing 22. Especially the error signal detector 63 is attached to a portion of the wheel housing 22 which supports the suspension system 80, specifically, to a portion of the wheel housing 22 on which the vibration generator 61 is mounted. This error signal detector 63 detects vibration of the portion of the wheel housing 22 on which the vibration generator 61 is mounted, in the vertical direction of the vehicle. That is to say, this error signal detector 63 detects vibration obtained by synthesizing vibration transmitted from the wheel 10 and the vibration force generated by the vibration generator 61.

Control Blocks of Active Vibration Noise Suppression Apparatus

Next, control blocks of the active vibration noise suppression apparatus will be described with reference to FIG. 3. The controller 100 controls the vibration generator 61 so as to reduce (cancel) the error signal by applying adaptive control and using a reference signal detected by the reference signal detector 62 and an error signal detected by the error signal detector 63.

The controller 100 comprises a first control unit 110 using a direct adaptive algorithm (hereinafter referred to as the "first adaptive algorithm"), a second control unit 130 using an adaptive algorithm using a feedforward coefficient (hereinafter referred to as the "second adaptive algorithm"), a storing unit 140 for storing the feedforward coefficient, and a switching unit 150 for switching based on vehicle information between the first control unit 110 and the second control unit 130 as a program to be executed. That is to say, adaptive control by the first control unit 110 and adaptive control by the second control unit 130 are selectively applied.

Each of the first control unit 110 and the second control unit 130 acquires a reference signal $r_k$ from the reference signal detector 62 and an error signal $e_k$ from the error signal detector 63, and generates a control signal $u_k$ for controlling the vibration generator 61 by using these two signals. Then, at the evaluation point 63 (at the position of the error signal detector 63), vibration or noise $d_k$ transmitted from the reference signal $r_k$ via a primary transfer path (a transfer function of this path is referred to as W) is synthesized with control vibration or control sound $y_k$ transmitted from the control signal $u_k$ via a secondary transfer path (a transfer function of this path is referred to as G). When the control vibration or control sound $y_k$ has the same amplitude but an opposite phase of the vibration or noise $d_k$, the vibration or noise $d_k$ can be completely cancelled at the evaluation point 63.

Figure 3:
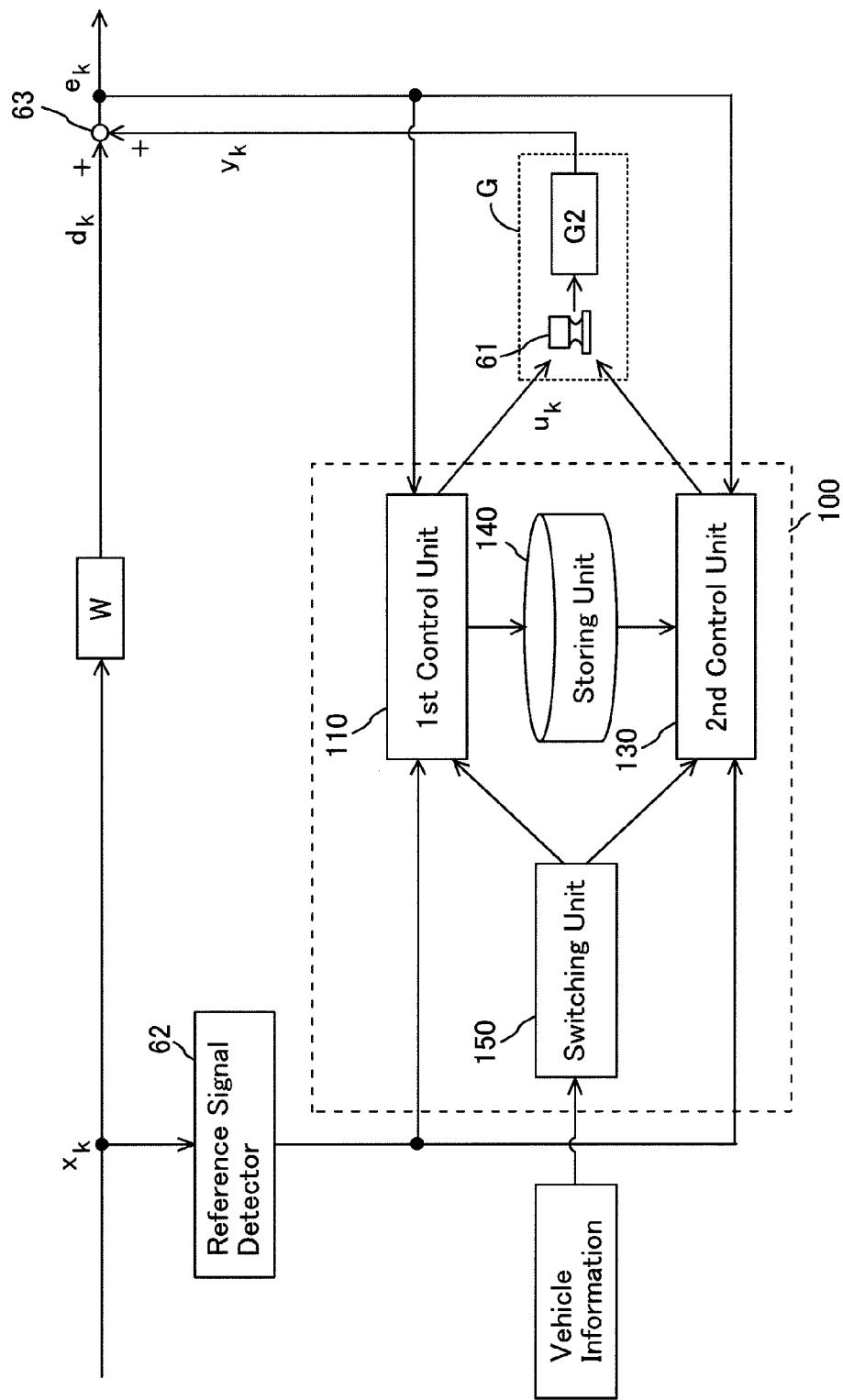
FIG. 3 is a function block diagram of a controller of FIG. 1 and also a control block diagram of a vibration or noise transfer system.

Here, in FIG. 3, G is the transfer function of the secondary transfer path, and G2 is a transfer function from the vibration generator 61 to the evaluation point 63. That is to say, G is a transfer function with a control signal $u_k$ as an input and with $y_k$ as an output.

Block Diagram for Control by First Control Unit

Figure 4:
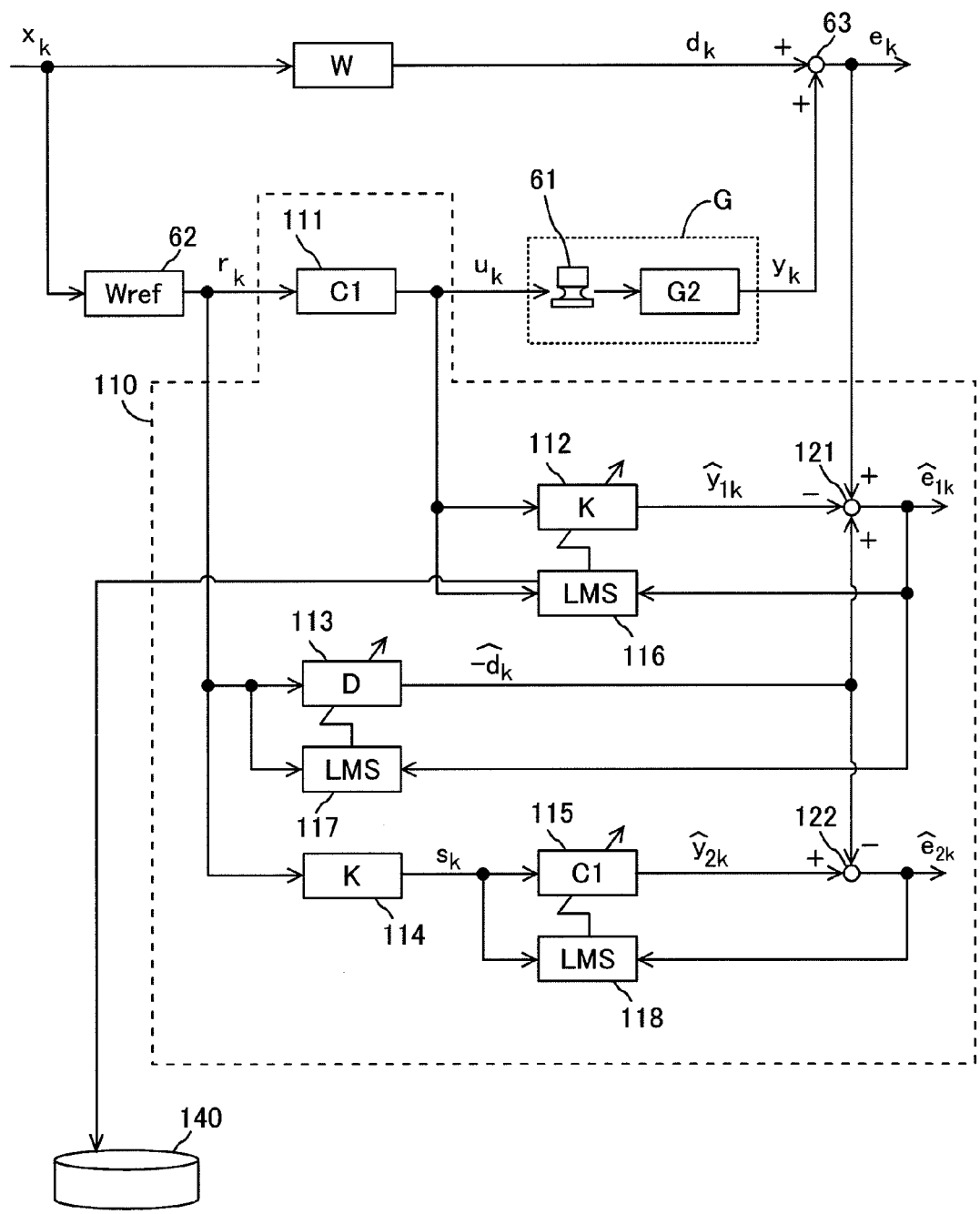
FIG. 4 is a control block diagram for controlling a vibration generator by a first control unit in FIG. 3.

Next, a block diagram for control by the first control unit 110 will be described with reference to FIG. 4. The first control unit 110 controls the vibration generator 61 so as to reduce (cancel) the error signal $e_k$ by implementing the first adaptive control algorithm as a direct adaptive algorithm and using the reference signal $r_k$ detected by the reference signal detector 62 and the error signal $e_k$ detected by the error signal detector 63.

That is to say, the first control unit 110 uses a filter coefficient C1 of the control signal $u_k$ as an adaptive filter. This adaptive filter C1 (hereinafter referred to as a "control signal adaptive filter") is updated by using the first adaptive algorithm as a direct adaptive algorithm. Here, a direct LMS algorithm is used as an example. Though not described in detail, a direct RLS algorithm and a direct FDA algorithm can be applied.

When an adaptive algorithm is not a direct adaptive algorithm, a secondary transfer function G needs to be determined. However, since the first adaptive algorithm as a direct adaptive algorithm is employed, the secondary transfer function G does not need to be determined. Specifically, an adaptive filter K corresponding to the secondary transfer function G is provided beforehand by employing the first adaptive algorithm as a direct adaptive algorithm, and the adaptive filter K can be adapted to a current value of the secondary transfer function G by being updated by an adaptive algorithm.

Then, in the first adaptive algorithm of this example, an equivalent value D of a function obtaining by reversing positive and negative signs of the first transfer function W is employed as an adaptive filter, in addition to the control signal adaptive filter C1 and the adaptive filter K as the equivalent value Gh of the secondary transfer function G. It should be noted that hereinafter, K is referred to as the secondary path adaptive filter and D is referred to as the primary path adaptive filter. Besides, a mark "^" on symbols in FIG. 4 is called a hat and means an estimate value. Although the mark "^" is used as it is in mathematical expressions, the mark "^" is described as "h" in the text for convenience of description.

Vibration $x_k$ input to the wheel 10 is transmitted to the evaluation point 63 via the primary transfer path (the transfer function W). The transmitted vibration at the evaluation point 63 is denoted by $d_k$. This relation is expressed by Equation (1). In Equation (1), * is a convolution operator and the suffix k represents sample number (time step).

[Math. 1]

$$d_k = W * x_k \quad (1)$$

On the other hand, in the first control unit 110, a control signal generating unit 111 processes the reference signal $r_k$ detected by the reference signal detector 62 (shown as "$W_{ref}$" in FIG. 4) with the control signal adaptive filter C1, thereby generating the control signal $u_k$, which is an electric signal expressed by Equation (2). In the first control unit 110, the control signal adaptive filter C1 is a filter coefficient of the control signal $u_k$.

[Math. 2]

$$u_k = C1 * r_k \quad (2)$$

Then, the vibration generator 61 outputs control vibration in accordance with the control signal $u_k$. The control vibration generated by the vibration generator 61 is transmitted to the evaluation point 63 through the transfer function G2. The transmitted control vibration at the evaluation point 63 is denoted by $y_k$. The aforementioned relation is expressed by Equation (3). An error signal at the evaluation point 63 is denoted by $e_k$ and expressed by Equation (4).

[Math. 3]

$$y_k = G * C1 * r_k \quad (3)$$

[Math. 4]

$$\begin{aligned} e_k &= d_k + y_k \\ &= d_k + G * C1 * r_k \end{aligned} \quad (4)$$

Subsequently, a first estimated error calculating unit 121 and a second estimated error calculating unit 122 respectively calculate a first estimated error $eh_{1k}$ and a second estimated error $eh_{2k}$ by using the reference signal $r_k$, the control signal $u_k$, the error signal $e_k$, the control signal adaptive filter C1, the secondary path adaptive filter K, and the primary path adaptive filter D. Then, the control signal adaptive filter C1, the primary path adaptive filter D and the secondary path adaptive filter K are updated by LMS algorithms based on the calculated first estimated error $eh_{1k}$ and the calculated second estimated error $eh_{2k}$.

The first estimated error $eh_{1k}$ and the second estimated error $eh_{2k}$ are expressed by Equations (5), (6). Here, in Equations (5), (6), a first estimated signal $yh_{1k}$, a second estimated signal $(-dh_k)$, and a fourth estimated signal $yh_{2k}$ are as follows. The first estimated signal $yh_{1k}$ is generated by processing the control signal $u_k$ with the secondary path adaptive filter K in a first estimated signal generating unit 112. The second estimated signal $(-dh_k)$ is generated by processing the reference signal $r_k$ with the primary path adaptive filter D in a second estimated signal generating unit 113. The fourth estimated signal $yh_{2k}$ is generated by processing a third estimated signal $s_k$, which has been generated by processing the reference signal $r_k$ with the secondary path adaptive filter K in a third estimated signal generating unit 114, with the control signal adaptive filter C1 in a fourth estimated signal generating unit 115.

[Math. 5]

$$\begin{aligned} \hat{e}_{1k} &= e_k - \hat{y}_{1k} + (-\hat{d}_k) \\ &= (d_k + G * C1 * r_k) - (K * u_k) + (D * r_k) \end{aligned} \quad (5)$$

[Math. 6]

$$\begin{aligned} \hat{e}_{2k} &= \hat{y}_{2k} - (-\hat{d}_k) \\ &= (C1 * K * r_k) - (D * r_k) \end{aligned} \quad (6)$$

Furthermore, a first filter updating unit 116 updates the secondary path adaptive filter K by implementing an LMS algorithm, so as to decrease the first estimated error $eh_{1k}$ to zero. Specifically, the first filter updating unit 116 updates the secondary path adaptive filter K by implementing an LMS algorithm based on the control signal $u_k$ and the first estimated error $eh_{1k}$. That is to say, the first filter updating unit 116 calculates a value of the secondary path adaptive filter K which minimizes an evaluation function J1, which is a square of the first estimated error $eh_{1k}$. Then, a formula for updating the secondary path adaptive filter K is expressed by Equation (7). It should be noted that in Equation (7), the suffixes (k+1), (k) are put in brackets for clearly showing an update of a value. Furthermore, μ1 denotes a step size parameter.

[Math. 7]

$$K_{(k+1)} = K_{(k)} - \mu 1 \cdot \left(\frac{\partial J1_{(k)}}{\partial K_{(k)}}\right) \quad (7)$$

$$= K_{(k)} - \mu 1 \cdot \left(2 \cdot \hat{e}_{1(k)} \cdot \frac{\partial \hat{e}_{1(k)}}{\partial K_{(k)}}\right)$$

$$= K_{(k)} + \mu 1 \cdot (2 \cdot \hat{e}_{1(k)} \cdot u_{(k)})$$

Moreover, a second filter updating unit 117 updates the primary path adaptive filter D by implementing an LMS algorithm, so as to decrease the first estimated error $eh_{1k}$ to zero. Specifically, the second filter updating unit 117 updates the primary path adaptive filter D by implementing an LMS algorithm based on the reference signal $r_k$ and the first estimated error $eh_{1k}$. That is to say, the second filter updating unit 117 calculates a value of the primary path adaptive filter D which minimizes an evaluation function J2, which is a square of the first estimated error $eh_{1k}$. Then, a formula for updating the primary path adaptive filter D is expressed by Equation (8). It should be noted that in Equation (8), the suffixes (k+1), (k) are put in brackets for clearly showing an update of a value. Furthermore, μ2 denotes a step size parameter.

[Math. 8]

$$D_{(k+1)} = D_{(k)} - \mu 2 \cdot \left(\frac{\partial J2_{(k)}}{\partial D_{(k)}}\right) \quad (8)$$

$$= D_{(k)} - \mu 2 \cdot \left(2 \cdot \hat{e}_{1(k)} \cdot \frac{\partial \hat{e}_{1(k)}}{\partial D_{(k)}}\right)$$

$$= D_{(k)} - \mu 2 \cdot (2 \cdot \hat{e}_{1(k)} \cdot r_{(k)})$$

Moreover, a third filter updating unit 118 updates the control signal adaptive filter C1 by implementing an LMS algorithm, so as to decrease the second estimated error $eh_{2k}$ to zero. Specifically, the third filter updating unit 118 updates the control signal adaptive filter C1 by implementing an LMS algorithm based on the reference signal $r_k$ and the second estimated error $eh_{2k}$. That is to say, the third filter updating unit 118 calculates a value of the control signal adaptive filter C1 which minimizes an evaluation function J3, which is a square of the second estimated error $eh_{2k}$. Then a formula for updating the control signal adaptive filter C1 is expressed by Equation (9). It should be noted that in Equation (9), the suffixes (k+1), (k) are put in brackets for clearly showing an update of a value. Furthermore, μ2 denotes a step size parameter.

[Math. 9]

$$C1_{(k+1)} = C1_{(k)} - \mu 3 \cdot \left(\frac{\partial J3_{(k)}}{\partial C1_{(k)}}\right) \quad (9)$$

$$= C1_{(k)} - \mu 3 \cdot \left(2 \cdot \hat{e}_{2(k)} \cdot \frac{\partial \hat{e}_{2(k)}}{\partial C1_{(k)}}\right)$$

$$= C1_{(k)} - \mu 3 \cdot \{2 \cdot \hat{e}_{2(k)} \cdot (K * r)_{(k)}\}$$

Then, the control signal generating unit 111 generates the control signal $u_k$ by using the control signal adaptive filter C1 updated by the third filter updating unit 118. Moreover, the first filter updating unit 116 commands the updated secondary path adaptive filter K to be stored in the storing unit 140. That is to say, the coefficient stored in the storing unit 140 is an updated value of the secondary path adaptive filter K generated by the first filter updating unit 116, that is to say, an updated value of an adaptive filter as the equivalent value Gh of the secondary transfer function G. The coefficient K stored in the storing unit 140 is used in adaptive control by the second control unit 130.

Block Diagram for Control by Second Control Unit

Next, a block diagram for control by the second control unit 130 will be described with reference to FIG. 5. The second control unit 130 controls the vibration generator 61 so as to reduce (cancel) the error signal $e_k$ by implementing the second adaptive control algorithm using the feedforward coefficient Gh (the equivalent value Gh of the secondary transfer function G) and using the reference signal $r_k$ detected by the reference signal detector 62 and the error signal $e_k$ detected by the error signal detector 63.

In the present example, a filtered-X LMS algorithm is implemented as an example of a control algorithm to be implemented. However, besides of this, an LMS algorithm, a RLS algorithm, and an FDA algorithm can be implemented.

Figure 5:
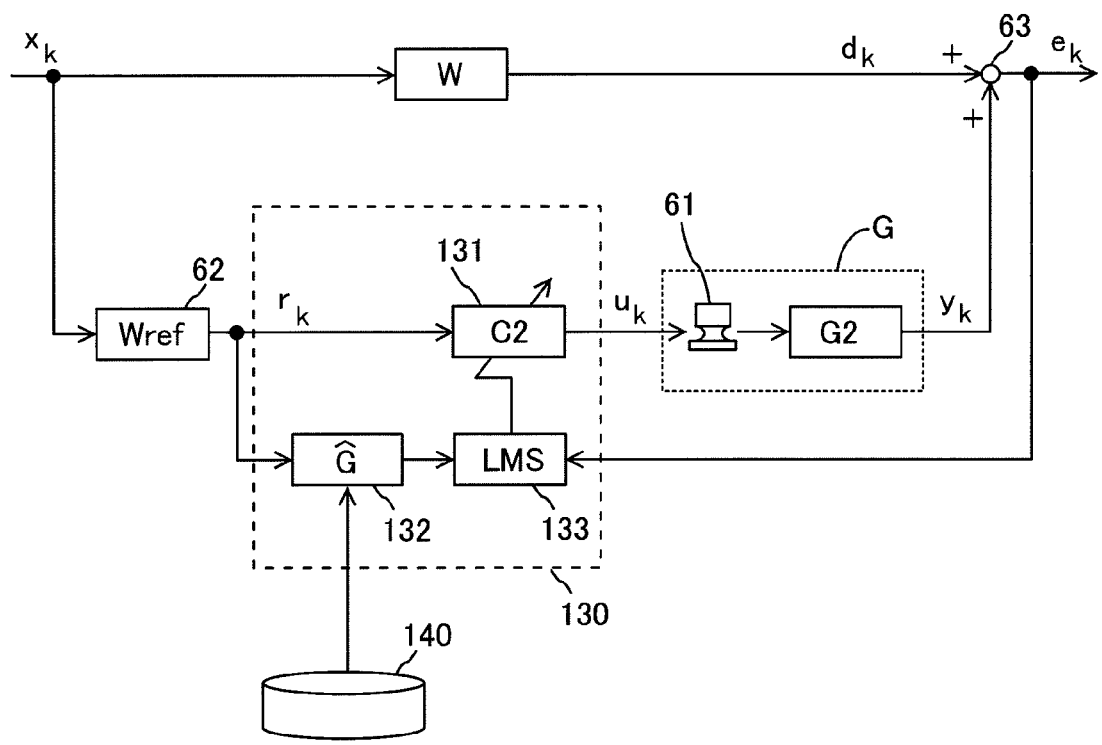
FIG. 5 is a control block diagram for controlling the vibration generator by a second control unit in FIG. 3.

As shown in FIG. 5, the second control unit 130 comprises a control signal generating unit 131, a feedforward coefficient acquiring unit 132 and a filter updating unit 133. The control signal generating unit 131 generates the control signal $u_k$ by using the reference signal $r_k$ detected by the reference signal detector 62 and a control signal adaptive filter C2 updated by the filter updating unit 133. This control signal $u_k$ is expressed by Equation (10). In the second control unit 130, the control signal adaptive filter C2 serves as a filter coefficient of the control signal $u_k$.

[Math. 10]

$$u_k = C2 * r_k \quad (10)$$

The feedforward coefficient acquiring unit 132 acquires the secondary path adaptive filter K stored in the storing unit 140. As mentioned before, the secondary path adaptive filter K is an adaptive filter as the equivalent value of the secondary transfer function G. This acquiring unit 132 uses the acquired secondary path adaptive filter K as a feedforward coefficient Gh.

The filter updating unit 133 updates the control signal adaptive filter C2 based on the reference signal $r_k$, the error signal $e_k$, and the feedforward coefficient Gh. The filter updating unit 133 uses, for example, a Filtered-X LMS algorithm. That is to say, the filter updating unit 133 updates the control signal adaptive filter C2 by implementing an LMS algorithm, so as to decrease the error signal $e_k$ to zero. Specifically, the filter updating unit 133 calculates a value of the control signal adaptive filter C2 which minimizes an evaluation function J4, which is a square of the error signal $e_k$. Then, a formula for updating the control signal adaptive filter C2 is expressed by Equation (11). It should be noted that in Equation (11), the suffixes (k+1), (k) are put in brackets for clearly showing an updated value. Furthermore, μ4 denotes a step size parameter.

[Math. 11]

$$C2_{(k+1)} = C2_{(k)} - \mu 4 \cdot \left(\frac{\partial J4_{(k)}}{\partial C2_{(k)}}\right) \quad (11)$$
$$= C2_{(k)} - \mu 4 \cdot \left(2 \cdot e_{(k)} \cdot \frac{\partial e_{(k)}}{\partial C2_{(k)}}\right)$$
$$= C2_{(k)} - \mu 4 \cdot \left\{2 \cdot e_{(k)} \cdot \left(\hat{G} * r\right)_{(k)}\right\}$$

Switch Procedure of Switching Unit

Figure 6:
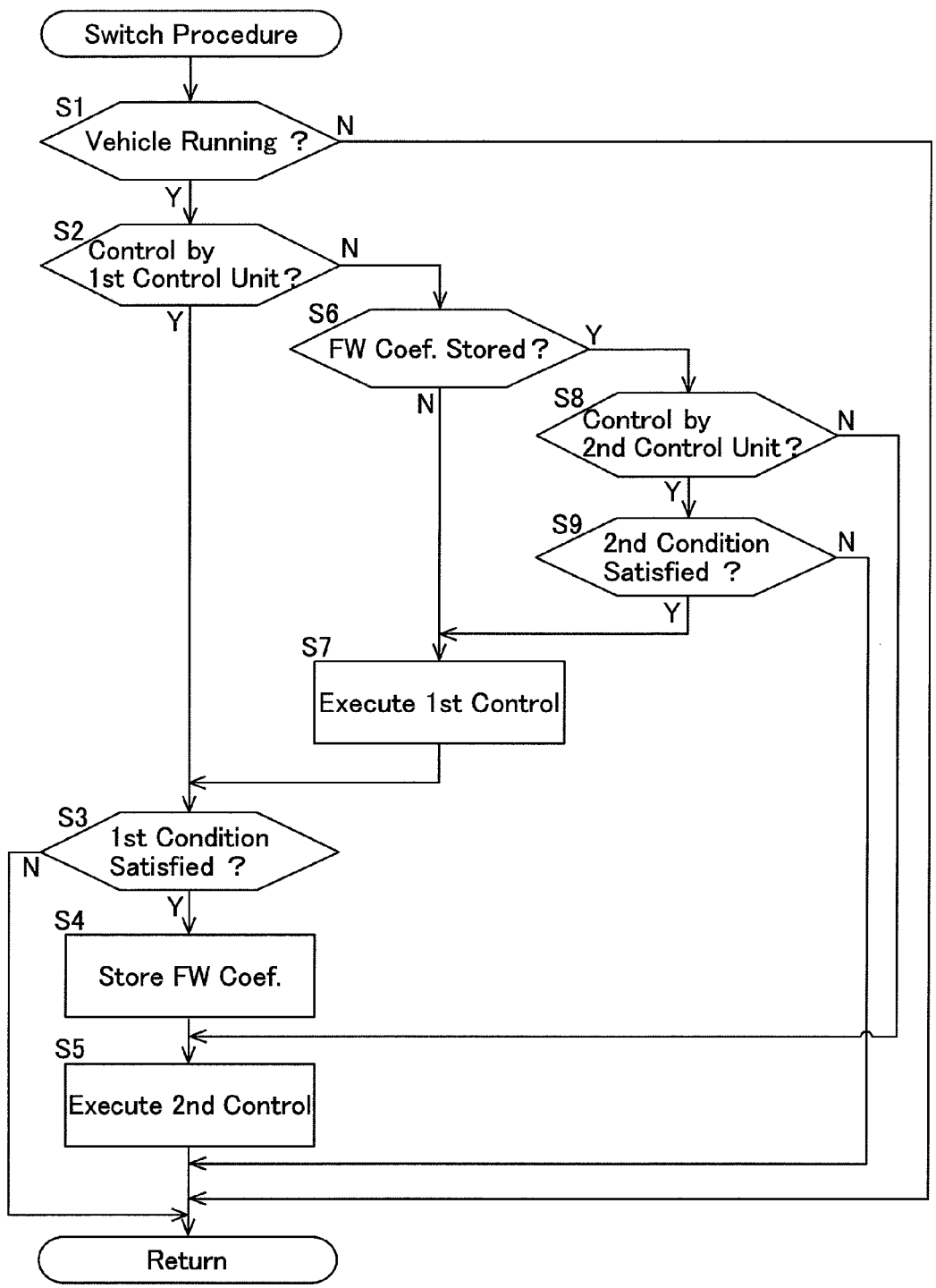
FIG. 6 is a flow chart showing a switch procedure of a switching unit in FIG. 3.

Next, a switch procedure of the switching unit 150 for switching between the first control unit 110 and the second control unit 130 will be described with reference to FIG. 6.

First, the switching unit 150 determines whether a vehicle is running or not (S1). If the vehicle is not running (S1: N), the switch procedure is returned. If the vehicle is running (S1: Y), the switching unit 150 determines whether the active vibration noise suppression apparatus is controlling the vibration generator 61 by the first control unit 110 or not (S2). When the active vibration noise suppression apparatus is controlling the vibration generator 61 by the first control unit 110 (S2: Y), the switching unit 150 determines whether a first condition is satisfied or not (S3). The first condition is a condition for determination based on vehicle information. For example, the first condition is either a lapse of time from a start of control by the first control unit 110 reaching a predetermined value or magnitude of the error signal $e_k$ under control by the first control unit 110 having decreased to a predetermined value or less.

Then, when the first condition is not satisfied (S3: N), the switch procedure is returned. When the first condition is satisfied (S3: Y), the switching unit 150 commands the feedforward coefficient (referred to as the "FW coefficient") to be stored in the storing unit 140 by the first filter updating unit 116 (S4). Here, the FW coefficient is stored when the first condition is satisfied. However, the FW coefficient can be sequentially updated and stored in the storing unit 140 while the first filter updating unit 116 is in operation.

After the FW coefficient is stored in S4, the switching unit 150 stops the control by the first control unit 110 and switches to control by the second control unit 130 (S5). That is to say, the control signal $u_k$ is generated by the second adaptive algorithm using the FW coefficient so as to drive the vibration generator 61. Then, this switch procedure is returned.

On the other hand, when the active vibration noise suppression apparatus is not controlling the vibration generator 61 by the first control unit 110 (S2: N), the switching unit 150 determines whether the FW coefficient is stored in the storing unit 140 or not (S6). When the FW coefficient is not stored (S6: N), control by the first control unit 110 is executed (S7) and the switching unit 150 goes to S3. On the other hand, when the FW coefficient is stored in the storing unit 140 in step S6 (S6: Y), the switching unit 150 determines whether the active vibration noise suppression apparatus is controlling the vibration generator 61 by the second control unit 130 or not (S8). If the active vibration noise suppression apparatus is not controlling the vibration generator 61 by the second control unit 130 (S8: N), the switching unit 150 goes to step S5, where control by the second control unit 130 is executed.

On the other hand, when the active vibration noise suppression apparatus is controlling the vibration generator 61 by the second control unit 130 (S8: Y), the switching unit 150 determines whether a second condition is satisfied or not (S9). The second condition is a condition for determination based on vehicle information. For example, the second condition is any one of the number of occupants exceeding a predetermined value, outdoor temperature exceeding a predetermined value, magnitude of the error signal $e_k$ exceeding a predetermined value, and air pressure of the tire 11 exceeding a predetermined value. When the second condition is satisfied (S9: Y), the switching unit 150 goes to step S7, where the switching unit 150 stops the control by the second control unit 130 and switches to control by the first control unit 110. On the other hand, when the second condition is not satisfied (S9: N), the switch procedure is returned.

The aforementioned switch procedure performs the following operations. As a first operation, an operation in an initial mode, i.e., when the FW coefficient is not stored in the storing unit 140, will be considered. In this case, S1→S2: N→S6: N→S7, where control by the first control unit 110, that is to say, adaptive control by the first adaptive algorithm as a direct adaptive algorithm is executed. The control by the first control unit 110 is continued until the first condition in step S3 is satisfied.

For example, if the first condition is that a lapse of time from a start of control by the first control unit 110 reaches a predetermined value and this amount of time passes, the FW coefficient is stored in the storing unit 140 and then the switching unit 150 switches from the control by the first control unit 110 to control by the second control unit 130. That is to say, if a certain amount of time passes from a start of control by the first control unit 110, the secondary path adaptive filter K has a value which is sufficiently close to an actual value of the secondary transfer function G. Therefore, if this filter K, which is the equivalent value Gh of the secondary transfer function G, is acquired, the control by the first control unit 110 is terminated. In the meanwhile, if the value of the FW coefficient which is sufficiently close to the actual value of the secondary transfer function G can be acquired, control by the second control unit 130 can sufficiently reduce vibration or noise.

As a second operation, an operation when a vehicle starts running again after having run once will be considered. In this case, the FW coefficient is already stored in the storing unit 140. Then, S1→S2: N→S6: Y→S8: N→S5, where control by the second control unit 130 is executed.

When the second condition is satisfied (S9: Y) while the vibration generator 61 is currently controlled by the second control unit 130 in common to the first and second operations, the switching unit 150 switches to control by the first control unit 110 and allows the FW coefficient to be updated. Then, the control by the second control unit 130 is executed again by using the updated FW coefficient.

Processing of the controller 100 in the present example makes use of a fact that the equivalent value of the secondary transfer function G is contained in the adaptive filters of the first adaptive algorithm as a direct adaptive algorithm. That is to say, determination of the FW coefficient to be used in the second control unit 130 is performed by executing the first adaptive algorithm as a direct adaptive algorithm. Therefore, when the control signal $u_k$ is generated by the first control unit 110, that is to say, when the vibration generator 61 is controlled so as to actively suppress vibration or noise, the equivalent value (the FW coefficient) of the secondary transfer function G is determined. Thus, the FW coefficient does not need to be determined beforehand. Moreover, since control by the first control unit 110 is executed even at the time of the determination, vibration or noise is not generated for that determination and furthermore, can be reduced even at the time of the determination.

However, when only the first adaptive algorithm as a direct adaptive algorithm is implemented, control effect is small. On the other hand, when a Filtered-X LMS algorithm is applied in determining the secondary transfer function G beforehand, control effect is great. Therefore, in the present example, after the FW coefficient is determined by the first adaptive algorithm, the second adaptive algorithm, which updates the adaptive filter by using the FW coefficient, is used. This second adaptive algorithm is, for example, a Filtered-X LMS adaptive algorithm. That is to say, a great control effect can be obtained by using the second adaptive algorithm. That is to say, the active vibration noise suppression apparatus is good in robustness.

Figure 7:
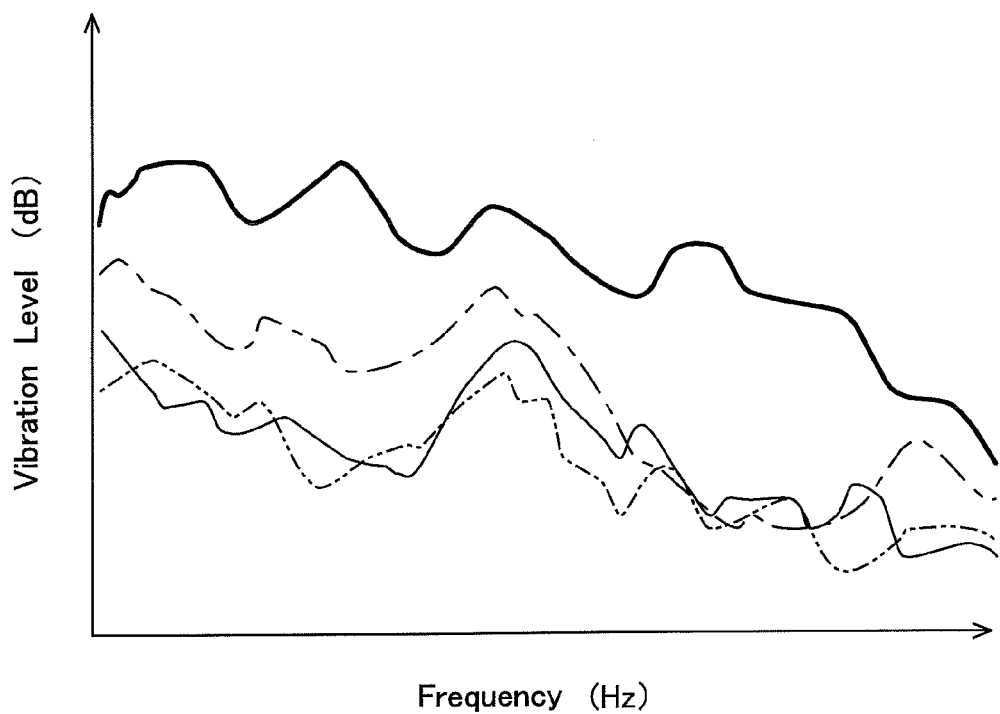
FIG. 7 is a graph showing vibration level vs the number of vibration frequency under control of the present example, under control by implementing only a direct adaptive algorithm, under control by implementing only a Filtered-X LMS algorithm or under no control.

Analysis results will be discussed with reference to FIG. 7. In FIG. 7, thick solid line indicates vibration under no suppression control, and thin solid line indicates vibration under control by the second control unit 130 in the present example. One-dot chain line indicates vibration under control using only a direct adaptive algorithm, and two-dot chain line indicates vibration under control by determining the second transfer function G beforehand and implementing a Filtered-X LMS algorithm.

As is apparent from FIG. 7, the effect of suppressing vibration is greater under the control using the Filtered-X LMS algorithm alone (two-dot chain line) than under the control using the direct adaptive algorithm alone (one-dot chain line). Moreover, the effect of suppressing vibration is greater in the present example (thin solid line) than under the control using the direct adaptive algorithm (one-dot chain line). Moreover, it can be said that the effect of the control of the preset example (thin solid line) is as great as that of the control using only the Filtered-X LMS algorithm (two-dot chain line).

Furthermore, employed in the present example is the vibration generator 61 which imparts vibration to a vibration member disposed in the primary transfer path from the reference point 62 (the position of the reference signal detector 62) to the evaluation point 63 (the position of the error signal detector 63). Here, in a vehicle, vibration between the vibration generator 61 and the evaluation point 63 is damped vibration having single degree or multiple degrees of freedom. In this damped vibration, mass, spring constant and a damping coefficient are very changeable. In other words, the secondary transfer function G is easily changeable. The aforementioned advantageous effects are reliably exhibited by thus applying the aforementioned solution to a structure having such an easily changeable secondary transfer function G.

Moreover, in the vehicle, mass, spring constant and a damping coefficient are affected by a change in the number of occupants, outdoor temperature, magnitude of the error signal, or air pressure of the tire 11. That is to say, a change in the secondary transfer function G is caused by a change in the number of occupants, outdoor temperature, magnitude of the error signal or air pressure of the tire 11. Therefore, the equivalent value (the FW coefficient) of the secondary transfer function G corresponding to the current conditions can be obtained by switching from the control by the second control unit 130 to the control by the first control unit 110 based on any one of these factors and updating the equivalent value Gh (the adaptive filter K) of the secondary transfer function G. As a result, vibration or noise can be reliably suppressed by the control by the second control unit 130.

A switch from the control by the first control unit 110 to the control by the second control unit 130 is carried out based on a lapse of time from a start of control by the first control unit 110 or magnitude of the error signal $e_k$. These can contribute to stabilization of the adaptive filter K as the equivalent value Gh of the secondary transfer function G in the first control unit 110. That is to say, precision can be increased in determination of the equivalent value Gh (corresponding to the FW coefficient) of the secondary transfer function G. As a result, vibration or noise can be reliably suppressed under the control by the second control unit 130.

By the way, in the present example, the control by the first control unit 110 and the control by the second control unit 130 are performed only while the vehicle runs. This is because road noise is not generated while the vehicle stops. Furthermore, as mentioned before, determination of the FW coefficient, i.e., acquisition of the equivalent value (the adaptive filter K) of the secondary transfer function G is performed while the first control unit 110 is controlling the vibration generator. That is to say, even if the FW coefficient is determined while the vehicle runs, advantageous effects of control by the first control unit 110 can be exhibited. However, since the effects of the control are smaller as shown in FIG. 7, it is preferred to switch to the control by the second control unit 130 immediately after an appropriate value of the FW coefficient is acquired.

Besides, it sometimes happens that the secondary transfer function G changes while the vehicle runs. That is to say, no matter what condition the vehicle is in, a value of the FW coefficient close to a current value of the secondary transfer function G can be acquired and the vibration generator 61 can be controlled by the second control unit 130 using this FW coefficient. Consequently, a great effect of suppressing vibration or noise can be obtained.

It should be noted that in the above case, when a target is road noise, determination of the FW coefficient is not necessary while the vehicle stops. However, when a target to be suppressed is not road noise but vibration or noise caused by engine vibration, that noise or vibration is generated while the vehicle idles. In such a case, the FW coefficient can be acquired by executing control by the first control unit 110 even while the vehicle stops. Of course, similarly to the above, the FW coefficient can be acquired by executing control by the first control unit 110 while the vehicle runs. Even when a target to be suppressed is vibration or noise caused by engine vibration, a great effect of suppressing vibration or noise is obtained because control can adapt to a change in the secondary transfer function G by determining the FW coefficient while the vehicle runs.

Example 2

Figure 8:
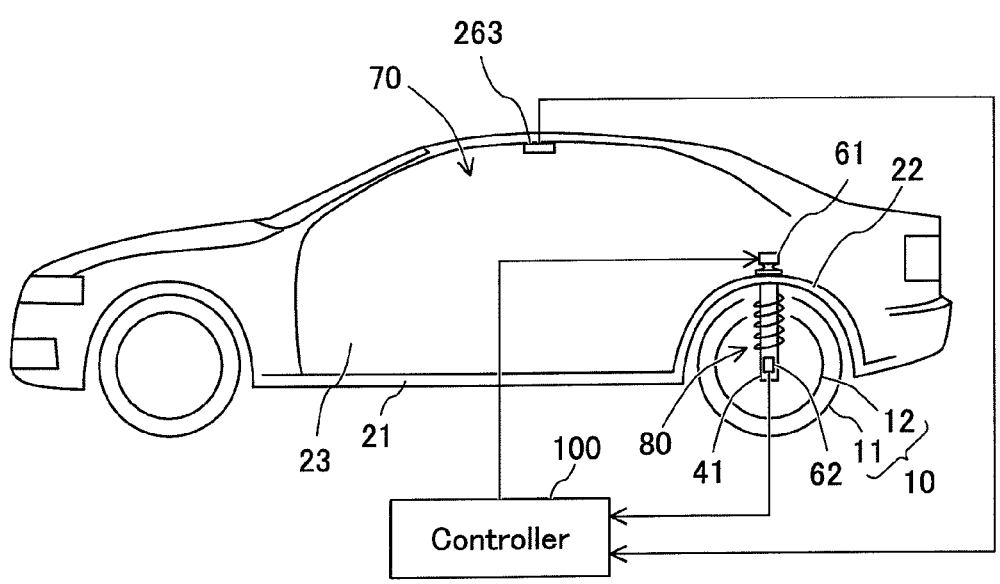
FIG. 8 is a view illustrating a structure of an active vibration noise suppression apparatus, applied to a vehicle, in Example 2 of the present invention.

Example 2 will be described with reference to FIG. 8. The same constituent components as those of Example 1 are assigned with the same reference numerals and their detailed description is omitted here. Example 2 is different from Example 1 in that an error signal detector 263 is a microphone disposed in the vehicle interior 70. That is to say, an evaluation point is a position of the microphone. In this case, of noise detected by the error signal detector 263 (the microphone) disposed in the vehicle interior 70, a component input from the tire 10 can be reduced by addition of vibration force by the vibration generator 61 to the tire housing 22. Also in such a structure, road noise in the vehicle interior 70 can be reduced by selectively using the first control unit 110 and the second control unit 130 in a similar manner to the above example.

What is claimed is:

1. An active vibration noise suppression apparatus for actively suppressing vibration or noise at an evaluation point by driving a drive device based on an actively updated control signal, which comprises:

a first controller generating a control signal by a first adaptive algorithm, the first adaptive algorithm is a direct adaptive algorithm using at least a filter coefficient C1 of the control signal and an equivalent value Gh of a secondary transfer function G from a point of outputting the control signal to the evaluation point as adaptive filters respectively;

a storage for storing the equivalent value of the secondary transfer function which is adaptively updated as an adaptive filter by the first controller; and a second controller generating the control signal by a second adaptive algorithm when the control signal is not generated by the first controller, the second adaptive algorithm using the equivalent value of the secondary transfer function stored in the storage as a feedforward coefficient and updating a filter coefficient C2 of the control signal as an adaptive filter based on the feedforward coefficient.

2. The active vibration noise suppression apparatus according to claim 1, wherein:

the active vibration noise suppression apparatus is applied to a vehicle; and the drive device is a vibration generator for imparting vibration to a vibration member disposed in a primary transfer path from a reference point to the evaluation point.

3. The active vibration noise suppression apparatus according to claim 1, wherein:

the active vibration noise suppression apparatus is applied to a vehicle;

while controlling the drive device by the second controller, the active vibration noise suppression apparatus switches from the control by the second controller to control by the first controller based on any one of the number of occupants, outdoor temperature, magnitude of an error signal, and air pressure of a tire; and the first controller updates the equivalent value of the secondary transfer function stored in the storage.

4. The active vibration noise suppression apparatus according to claim 3, wherein:

while controlling the drive device by the first controller, the active vibration noise suppression apparatus switches from the control by the first controller to control by the second controller based on a lapse of time from a start of the control by the first controller or magnitude of the error signal; and the second controller starts the control based on the updated equivalent value of the secondary transfer function.

5. The active vibration noise suppression apparatus according to claim 1, wherein:

the active vibration noise suppression apparatus is applied to a vehicle; and the equivalent value of the secondary transfer function stored in the storage is the adaptive filter generated by the first controller while the first controller generates the control signal while the vehicle is running.

* * * * *